3,246,047
GAS-LIQUID CATALYTIC ALKYLATION
Charles C. Chapman and Joe Van Pool, Bartlesville, Okla., assignors to Phillips Petroleum Company, a corporation of Delaware
Filed Oct. 1, 1962, Ser. No. 227,148
10 Claims. (Cl. 260—683.48)

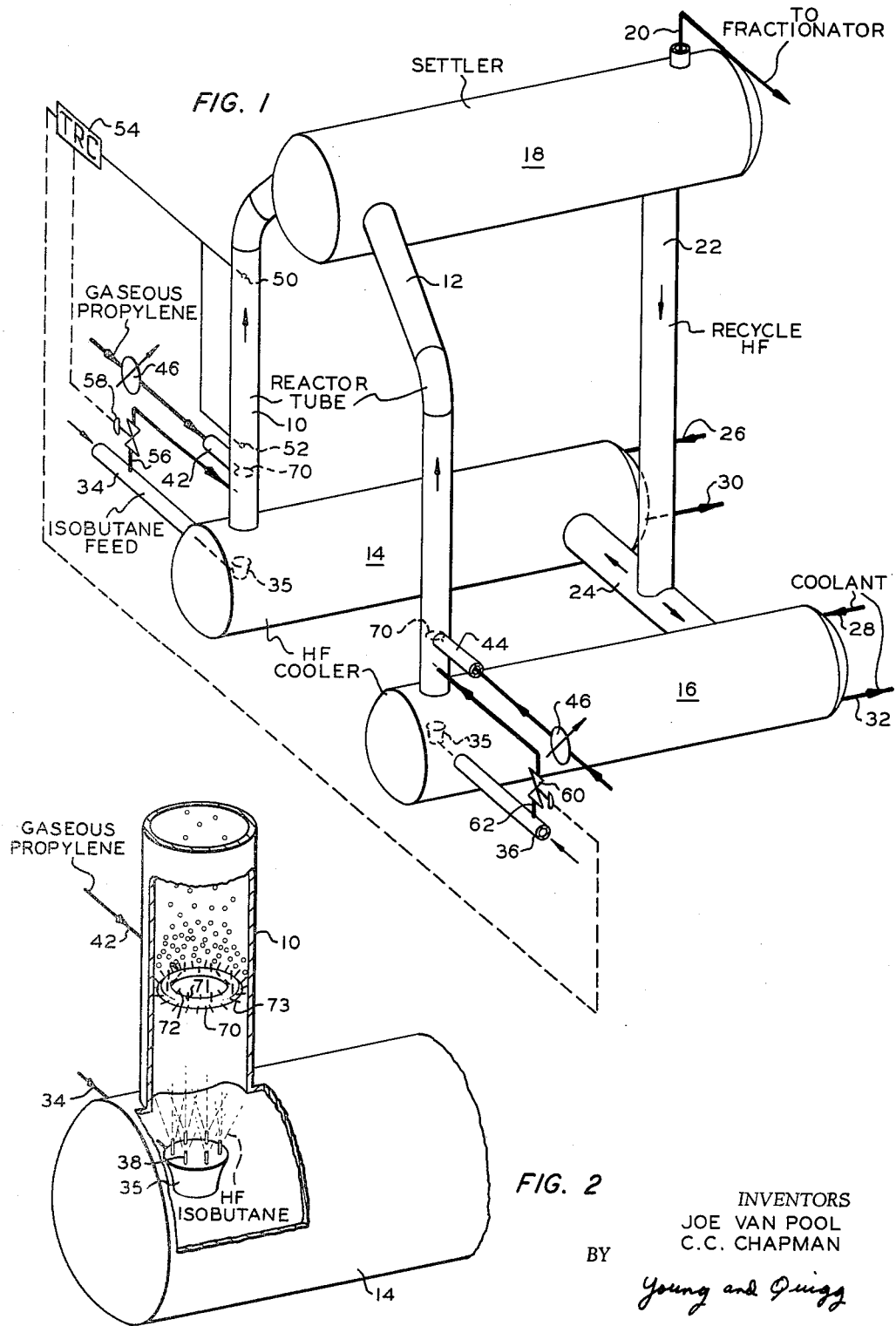

This invention relates to the alkylation of a liquid alkylatable hydrocarbon with a gaseous alkylating agent in the presence of a liquid catalyst. In one aspect the invention relates to an improved process for extending the reaction zone in which the alkylating agent and the alkylatable hydrocarbon can react.

The alkylation of an alkylatable hydrocarbon, such as an isoparaffin, with an alkylating agent, such as an olefin, has been practiced utilizing various alkylation catalysts, particularly HF acid. Frequently employed isoparaffins include isobutane and isopentane and frequently employed olefins include propylene, butylene and amylene. One of the major problems associated with the catalytic alkylation of hydrocarbons lies in the handling of the alkylation catalyst, that is, transporting the catalyst through the various parts of the reaction and recovery system. The problem is particularly aggravated when acid catalyst such as hydrofluoric acid, sulfuric acid and the like, are employed since these materials are highly corrosive to ordinary materials of construction. A number of methods have been proposed for the alkylation of isoparaffins and the like. One suitable method is disclosed in the copending application of G. E. Hays et al., Serial No. 807,454, filed April 20, 1959. The proposed process therein provides cyclic flow of liquid alkylation catalyst in series to a vertically elongated reaction zone, a settling zone, a cooling zone and return to said reaction zone, said zones being in open communication with each other, with the flow being caused solely by energy imparted to the catalyst by flowing hydrocarbons and density and temperature differences in said zone. The liquid hydrocarbon feed material, comprising the alkylatable hydrocarbon and an alkylating agent, is introduced at high velocity into the lower portion of the reaction zone into a continuous catalyst phase maintained in said zone. Suitable conditions of temperature and residence time are provided in the reaction zone whereby the alkylatable hydrocarbon is alkylated. A stream comprising alkylation catalyst, alkylate and unconsumed reactants passes from the upper portion of the reaction zone to a settling zone wherein separation occurs between hydrocarbon and catalyst phases. The hydrocarbon phase is withdrawn from the settling zone for further processing such as fractionation as required and the catalyst phase passes downwardly through the cooling zone and thereafter into the lower portion of the reaction zone. It is provided therein that the liquid hydrocarbon feed mixture of alkylated hydrocarbon and alkylating agent are introduced upwardly into the reaction zone as a plurality of high velocity streams of a small cross section relative to said zone.

This invention represents an improvement over the copending application of G. E. Hays et al., supra, and makes it possible to obtain an alkylate having an improved octane rating.

It is an object of the invention to provide an improved method for the alkylation of hydrocarbons, particularly the alkylation of an isoparaffin with olefins.

Yet another object of the invention is to provide a method of maintaining a very high ratio of alkylatable hydrocarbons to alkylating agent within the reactor with a constant feed ratio.

It is another object of this invention to provide an improved method for the alkylation of hydrocarbons whereby the olefins present an extremely high interfacial area of contact with the isoparaffins and catalyst.

Still another object of the invention is to provide an extended reaction zone for the alkylation of alkylatable hydrocarbons with an alkylating agent.

These and other objects of the invention will be readily apparent to those skilled in the art from the following detailed description, drawing and appended claims.

These objects are broadly accomplished by introducing a liquid mixture comprising an alkylatable hydrocarbon and an alkylation catalyst at a high velocity upwardly into the lower portion of a vertically extended reaction zone with said catalyst being the continuous phase, introducing a gaseous alkylating agent into said zone down stream from the point of introduction of said liquid mixture, maintaining suitable conditions of temperature and residence times in said reaction zone whereby said alkylatable hydrocarbon is alkylated, and recovering alkylate from the downstream end portion of said reaction zone.

In one aspect of the invention the gaseous alkylating agent is introduced upwardly into said zone.

In another aspect of the invention the catalyst is substantially saturated with said alkylatable hydrocarbon prior to introduction of said alkylating agent.

In still another aspect of the invention the temperature at the point of introduction of said alkylating agent to said reaction zone is sufficient to maintain said hydrocarbon and said alkylation catalyst in liquid phase and sufficient to gradually condense the incoming alkylating agent. By the expression vaporous or gaseous alkylating agent is meant herein an agent which will condense within the reactor at the conditions of alkylation.

In general, any of the conventional catalytic alkylation reactions can be carried out by the method of the present invention. Thus the alkylation reaction can comprise reaction of an isoparaffin with an olefin or other alkylatable material, reaction of a normal paraffin with an olefin or other alkylatable material, or reaction of an aromatic hydrocarbon with an olefin or other alkylatable material; the reaction in each instance being carried out in the presence of a suitable alkylation catalyst. Suitable olefins include ethylene, propylene, butenes, pentenes, etc. Also operable are various materials known to those skilled in the art, e.g., alcohols and ethers, such as isopropyl alcohol, tertiary butyl alcohol, secondary butyl alcohol, isopropyl ether, and the like; likewise, the corresponding alkyl esters such as the alkyl halides, sulfates, phosphates, fluorides of the olefins.

A wide variety of alkylation catalyst can be employed in the alkylation reaction including well known catalysts such as sulfuric acid, hydrofluoric acid, phosphoric acid, metal halides such as aluminum chloride, aluminum bromide, and the like and other liquid alkylation catalysts. The preferred catalyst is HF acid which may be fortified with $BF_3$ or the like.

In the alkylation of isoparaffins with olefins a substantial molar excess of isoparaffin to olefin is employed, usually to provide an external feed ratio in the range of 80,000 to 340,000 s.c.f. of olefin per 1000 barrel of isoparaffin, preferably about 170,000 s.c.f. of propylene and/or butylenes per 1000 barrel of isobutane and/or isopentane. (S.c.f refers to standard cubic feet measured at 60° F. and 1 atmosphere.) Although the internal liquid volume ratio is not directly measurable it is estimated to be at least 10 times, preferably at least 50 times, the external ratio. It is particularly an advantageous feature of the present invention that an excess of isoparaffin is present at all times in admixture with the catalyst when and after the olefin is introduced into the reaction zone. In addition, an increase in total alkylate is possible since less heavy alkylate is produced. This is possible because a larger volume of light alkylate is produced from the same volume of olefin. A higher octane rating is the result. The liquid volume ratio of total hydrocarbon to HF is in the range of 1:0.25 to 1:20, preferably about 1:8.

The reaction zone is maintained under sufficient pressure to insure that the alkylatable hydrocarbon and alkylation catalyst are in the liquid phase. The temperature is selected not only to provide a suitable alkylating temperature but also to insure that the incoming gaseous olefin is gradually condensed throughout the upper portion of the reaction zone. The reaction conditions can vary in temperature from subzero temperatures to temperatures as high as several hundred degrees F. and can be carried out at pressures varying from atmospheric to as high as 1000 p.s.i.a. and higher and space velocities from about 0.1 to about 20.

It is generally recognized that alkylation does not occur in the vapor phase. By the method of this invention the olefin is dispersed into the reaction zone as vapor bubbles which will insure maximum dispersion of the olefin and will result in much better contact than conventional liquid to liquid contact. Since the reaction takes place in the acid phase or interface and since the outside moles of a bubble of olefin will condense and react first, the effective isobutane to olefin ratio will be much higher in the reaction zone by this method than in the conventional reaction where all the olefin is in the reaction zone as a liquid at the same time. The rate that the olefin condenses can be controlled by the temperature of the acid at any given pressure and isobutane mixture. The zone of reaction can therefore be extended in the reactor for the best alkylation. The gaseous olefin must be condensed within the reaction zone. Control of the condensation is similar to condensing steam injected into water. If the water is cold the steam will condense near the steam nozzle; as the water temperature increases the steam bubbles rise higher in the water before condensing. It has been found that for propylene alkylation that reaction temperatures in the range of 50 to 140° F. at pressures in the range of 100–230 p.s.i.a. produce satisfactory alkylate. Extending the zone of reaction for the propylene is most beneficial and by the method of this invention the reaction can be carried out at a high degree of dispersion of the olefin. The high isobutane to olefin ratios with control of the temperature spreads the reaction to the desired extent through the reactor. Preferably the gaseous olefin is introduced at a point ½ to 2 reactor diameters downstream from the point of introduction of the liquid isoparaffin.

By the method of this invention it is possible to achieve a high rate of mass transfer, that is, the rapid incorporation of the bubbles of hydrocarbon to the catalyst by the use of as high an interfacial area and for as long a period of time as possible with the minimum of emulsification.

Further, it has been established that the direction of flow of the hydrocarbons in relation to the direction of flow of the liquid catalyst is most important. In other words, the catalyst flow pattern must be established in the same direction as the liquid hydrocarbon feed at the point of contact with the liquid hydrocarbon. It has also now been discovered that there is additional value in introducing the gaseous olefin upwardly into the liquid stream of acid catalyst and alkylatable hydrocarbon in the same direction as the flow of the mixture. By thus injecting stream of gaseous alkylating agent into the stream of liquid acid catalyst-alkylatable hydrocarbon the bubbles of gas flow upwardly with the catalyst phase thereby maintaining their high interfacial area and gradually condenses.

For purposes of simplification the invention is described with relation to a process for alkylating an isoparaffin, such as isobutane, with an olefin such as propylene, in the presence of an alkylation catalyst such as HF acid. However, the invention is not to be so limited. For example, it is also possible to introduce other gaseous olefins into the reactor, such as butenes, pentenes and the like, at same or different locations.

It is an important advantage with this invention that an intimate admixture of the liquid alkylatable hydrocarbon and liquid alkylation catalyst is effected prior to introduction of the gaseous olefin. It is most desirable that there be a substantial excess of the alkylatable hydrocarbon to the olefin. These criteria are fully met by this invention, particularly when the catalyst is substantially saturated with the isobutane prior to the point of introduction of the propylene downstream from the point of introduction of the catalyst and isobutane into the reaction zone.

The catalyst is preferably 88 to 92 percent by weight HF with a water content in the range of 0.1 to 1.0 percent and an acid soluble to oil content in the range of 0.1 to 1.0 percent, the remainder being dissolved hydrocarbons. The HF recycle rate is in the range of 0.25 to 20 volumes of HF per volume of hydrocarbon.

The reaction time is governed by the nature of the equipment used, the particular alkylating agent, alkylatable hydrocarbon and catalyst employed, temperature, pressure and the like. In general the time of reaction is in the range of 5 to 40 seconds for the continuous tubular type reactor illustrated herein. In conventional alkylation reactors the reaction time may vary from 5 to 20 minutes.

A suitable temperature range for the alkylation of isoparaffins with olefins is from 40 to 130° F. In the successive alkylation of isobutane with butylenes and with propylene the temperature differential between the inlet end of the reactor and the outlet end is in the range of from 0.1 to 70° F. In an operation in which amylenes, butylenes, and propylene are injected progressively downstream in this order, the optimum temperature differential between the inlet end and the outlet end of the reactor is in the range of 0.1 to 50° F. Similar temperature and temperature differentials are applicable to the alkylation of isopentane with these olefins.

A more complete understanding of the invention may be had by reference to the accompanying schematic drawing of which FIGURE 1 is a 3-dimensional or pictorial view of the preferred arrangement of apparatus in accordance with the invention and FIGURE 2 is an inset view of the preferred apparatus for the introduction of the gaseous olefin and liquid isoparaffin into the reaction zone.

Referring to FIGURE 1, a pair of tubular reactors 10 and 12 are connected at their lower ends with acid coolers 14 and 16 respectively, and at their upper ends with settler 18. Settler 18 is provided with an alkylate take-off line 20 which connects from the upper section of the settler and leads to the fractionation column (not shown). A recycle acid conduit 22 connects at the bottom of settler 18 with coolers 14 and 16 through conduit 24. Coolers 14 and 16 are indirect heat exchangers which are connected with inlet coolant lines 26 and 28, respectively, and with outlet coolant lines 30 and 32 respectively. Feed lines 34 and 36 connect with the inlet ends of tubular reactors 10 and 12 respectively to the adjacent ends of coolers 14 and 16. Eductors 38 and 40 on the ends of lines 34 and 36, respectively, serve to inject the isoparaffin into the respective tubular reactors in the direction of flow of the catalyst and cause the flow of catalyst through the reactors. The olefin is injected into an intermediate section of the reactors through feed lines 42 and 44 each of which is provided with a heat exchanger 46.

The flow through the system shown in FIGURE 1 is effected by the injection and eductor effect of the feed entering through lines 34 and 36 as well as the olefin injected through lines 42 and 44. The type of flow control involved is disclosed in the aforesaid U.S. applications, Serial No. 88,517 and Serial No. 807,454, both now abandoned.

Preferably the eductor comprises an orifice plate containing a plurality of conduits of small cross section which terminate within the bottom opening of reactors 10 and 12 such as shown in FIGURE 2. The simultaneous upward movement of acid and hydrocarbon results from a combination of (1) the kinetic energy of the hydrocarbon feed and (2) the difference in density of the acid hydrocarbon mixture in reactors 10 and 12 as compared to the continuous acid phase. As the vaporous olefin is introduced through conduit 42, contacts the acid catalyst and hydrocarbon and condenses, the reaction occurs between the olefin and isoparaffin. Since the reaction is exothermic the temperature of the acid and reactants increases as the reaction mixture flows upwardly to the reactors. Within a very short period of time, usually in the order of 1 to 40 seconds, the alkylation reaction is completed after which reaction effluent containing hydrocarbon product (alkylate), acid catalyst and unreacted feed hydrocarbons passes from the reactors entering the upstream end of the settler surge vessel. In order to reduce turbulence and shorten the time required for phase separation of the effluent in the settler, the effluent is frequently passed through a straightening vane section (not shown) which is positioned in the surge vessel adjacent the point of entry of the effluent. Separation of the alkylation reaction effluent into acid and hydrocarbon phases, which commences with introduction of the reaction effluent into the settler, is substantially completed by the time the effluent reaches the opposite end of the vessel. The upper phase or hydrocarbon phase is withdrawn from the settler through conduit 20 and yielded for further treatment including fractionation (not shown) as required. The lower acid phase passes from the settler downwardly through conduit 22 and is divided into substantially equal quantities in conduit 24 through which it is introduced into coolers 14 and 16, respectively. Acid passing through the coolers is reduced in temperature sufficiently to remove heat picked up during the alkylation reaction.

In the alkylation of low boiling olefins with low boiling isoparaffins when employing hydrofluoric acid as the akylation catalyst the acid circulation rate is between about 1 and about 8 volumes of acid per volume of hydrocarbon reactants preferably from 2 to 4 volumes per volume. The kinetic energy present in the flowing hydrocarbon is a function of the velocity of the hydrocarbon. This velocity can vary between about 0.1 and about 50 feet per second, however, usually the velocity is between about 0.5 and 20 feet per second and more preferably in the range of 0.5 to 10 feet per second.

Suitable temperature control may be effected by control of the temperature of the acid in acid cooler 14 and the temperature of the feed introduced through both inlets 34 and 42 and the corresponding lines of the other reactor. Temperature control can also be effected by sensing the temperature at one or more points along the reactor downstream of the inlet end thereof such as at 50 and/or at 52 and utilizing temperature recorder controller 54 to control the amount of bypass of feed from line 34 into the reactor through line 56 by means of a motor valve 58 which is actuated by temperature controller 54. A similar control arrangement is applicable to motor valve 60 in by pass line 62 on the other reactor.

FIGURE 2 is a simple illustration of a possible method and apparatus for the injection of the liquid isoparaffin and gaseous olefin into the flow path of the acid isobutane mixture. As discussed hereinbefore it is preferred that the gaseous olefin enter the reaction zone with its flow pattern established in the same direction of flow as the pattern of the acid isobutane. A number of methods and apparatus can be employed. One suitable method is shown in the drawing wherein the incoming liquid isoparaffin is introduced into the catalyst in the same direction of flow as the established flow of the catalyst. The isoparaffin enters through conduit 34, flared tube 35 and multiple conduits 38. Flared tube 35 may simply terminate in an orifice plate but it is preferred to assist the flow pattern by the employment of conduits as shown. The gaseous olefin then enters downstream from the point of isoparaffin introduction. A hollow ring 70, perpendicular to the established flow, is in communication with conduit 42 and contains a multiplicity of openings in the upper portion thereof. Preferably these openings terminate in short conduits 71, 72, 73 which supply equal amounts of olefin per unit of area in the reactor. For example, conduits 71 are vertical and conduits 72, 73 are at about 30 degrees with the vertical and the number of conduits 73 are greater than the number of conduits 71 which in turn are greater in number than the conduits 72. This distribution of conduits assists in the even distribution of olefin over the entire cross sectional area of the reactor.

This invention is best illustrated by reference to the following specific embodiment.

An alkylation reactor, settler and HF cooling system of the type illustrated in the drawing is employed for the alkylation of liquid isobutane with gaseous propylene in the presence of liquid HF acid catalyst. The HF is cooled to 80° F. in the cooler and passes upwardly into the reactor where 1000 barrels per day of liquid isobutane are injected at a temperature of 80° F. and 150 p.s.i.g. The reactor is operated at 135 p.s.i.g. The temperature at the bottom of the reactor is 80° F. and at the top the temperature is 83° F. Gaseous propylene is injected at 170,000 s.c.f. per day at 285 p.s.i.g. and 135° F. at a point 2 reactor diameters downstream from the point of isobutane injection. The alkylate produced has an octane number of 102.4 compared to 98.6 for a similar system employing liquid propylene feed; further, there is an increase in total alkylate of 3 volume percent.

We claim:
1. A process for alkylating an alkylatable hydrocarbon in the presence of an alkylation catalyst in a vertically extended reaction zone comprising introducing a liquid mixture comprising an alkylatable hydrocarbon and an alkylation catalysts at a high velocity into the lower end portion of said zone with said catalyst being the continuous phase, introducing a gaseous alkylating agent into said zone downstream from said liquid mixture introduction, maintaining suitable conditions of temperature, pressure and residence times in said reaction zone to maintain said alkylatable hydrocarbon and said alkylation catalyst in liquid phase and to condense the incoming alkylating agent whereby said alkylatable hydrocarbon is alkylated, and recovering alkylate from an upper end portion of said zone.

2. The process of claim 1 wherein said gaseous alkylating agent is introduced upwardly into said zone.

3. The process of claim 1 wherein said catalyst is substantially saturated with alkylatable hydrocarbon prior to introduction of said gaseous alkylating agent.

4. A process for alkylating an isoparaffin in the presence of HF acid catalyst in a vertically extended reaction zone comprising introducing a liquid mixture comprising an isoparaffin and said catalyst at a high velocity into the lower end portion of said zone with said catalyst being the continuous phase, introducing a gaseous olefin upwardly into said zone downstream from said liquid mixture introduction, maintaining suitable conditions of temperature, pressure and residence time in said reaction zone to maintain said isoparaffin and said catalyst in liquid phase and to condense the incoming olefin whereby said isoparaffin is alkylated, and recovering alkylate from an upper end portion of said zone.

5. The process of claim 4 wherein said isoparaffin comprises isobutane.

6. The process of claim 4 wherein said olefin comprises propylene.

7. The process for alkylating an isoparaffin with an olefin in the presence of an alkylation catalyst in a vertically extended reaction zone wherein the upward flow of catalyst and reactants in said zone is caused solely by energy imparted to said zone by flowing hydrocarbon and density differential comprising introducing said alkylation catalyst substantially saturated with isoparaffin at high velocity into the lower end portion of said zone with said catalyst being the continuous phase, introducing a gaseous olefin upwardly into said zone downstream from said catalyst introduction, said reaction zone being maintained at alkylation conditions with a temperature and pressure sufficient to maintain said catalyst and isoparaffin in liquid phase and sufficient to gradually condense the incoming olefin, and recovering alkylate from the upper end portion of said zone.

8. A process for alkylating isobutane with propylene in the presence of hydrofluoric acid catalyst in a vertically extended reaction zone with the upward flow of catalyst and reactants in said zone being caused solely by energy imparted to said catalyst by flowing hydrocarbons and density differential comprising introducing said catalyst substantially saturated with isobutane at a high velocity upwardly into the lower end portion of said zone, introducing gaseous propylene in the ratio in the range of 80,000 to 340,000 s.c.f. of propylene per 1000 barrel of liquid isobutane upwardly into said zone downstream from said catalyst introduction, said reaction zone being maintained at alkylation conditions at a temperature in the range of 50 to 140° F. with the temperature and pressure being selected to maintain said hydrofluoric acid catalyst and isobutane in liquid phase and to gradually condense the incoming propylene and recovering alkylate from the downstream end portion of said zone.

9. In a cyclic process for alkylating an alkylatable hydrocarbon in the presence of an alkylation catalyst wherein the catalyst flows through a path including in series and in open communication a vertically extended reaction zone, a settling zone, a cooling zone and return to said reaction zone solely by energy imparted to said catalyst by flowing hydrocarbons and density differential in said zones, the improvement comprising introducing a liquid mixture comprising an alkylatable hydrocarbon and an alkylation catalyst at high velocity upwardly into the lower end portion of said zone with said catalyst being in continuous phase, introducing a gaseous alkylating agent upwardly into said zone downstream from said liquid mixture introduction, maintaining suitable conditions of temperature, pressure and residence time in said reaction zone to maintain said alkylatable hydrocarbon and said alkylation catalyst in liquid phase and to condense the incoming alkylating agent whereby said hydrocarbon is alkylated, passing alkylation reaction effluent comprising said catalyst, alkylate and unconsumed reactants from the upper portion of said reaction zone into said settling zone wherein phase separation takes place to provide a catalyst phase and a hydrocarbon phase containing alkylate, withdrawing the hydrocarbons from an upper portion of said settling zone, passing catalyst from said settling zone downwardly into said cooling zone and passing cooled acid from the cooling zone into the lower portion of said reaction zone.

10. In a cyclic process for alkylating liquid isobutane in the presence of a liquid HF acid catalyst where the catalyst flows through a path comprising in series and in open communication: a vertically extended reaction zone, a settling zone, a cooling zone and return to said reaction zone solely by energy imparted to said catalyst by flowing hydrocarbons and density differential in said zones, the improvement comprising introducing said liquid HF acid catalyst substantially saturated with an isobutane at high velocities upwardly in the lower end portion of said zone with said catalyst being the continuous phase, introducing gaseous propylene upwardly into said zone in the same direction of flow as the catalyst but downstream from said catalyst introduction, said reaction zone being maintained at alkylation conditions at a temperature in the range of 50° to 140° F. with the temperature and pressure being sufficient to maintain said HF acid catalyst and isobutane in liquid phase and sufficient to gradually condense the incoming propylene, maintaining suitable residence time in said reaction zone in the range of 5 to 40 seconds whereby said isobutane is alkylated, passing alkylation reaction effluent comprising said catalyst, alkylate and unconsumed reactants from the upper portion of said reaction zone into said settling zone wherein phase separation takes place to provide a catalyst phase and a hydrocarbon phase containing alkylate, withdrawing hydrocarbon from an upper portion of said settling zone, passing liquid catalyst from said settling zone downwardly into said cooling zone and passing cooled acid from the cooling zone into the lower portion of said reaction zone.

References Cited by the Examiner
UNITED STATES PATENTS

| 2,386,681 | 10/1945 | Hadden | 260—683.52 |
| 2,720,447 | 10/1955 | Jones et al. | 260—683.58 |
| 2,855,449 | 10/1958 | Owen | 260—683.58 |
| 2,937,079 | 5/1960 | Van Pool | 260—683.59 |
| 3,080,438 | 3/1963 | Sailors | 260—683.48 |

DELBERT E. GANTZ, *Primary Examiner.*

DANIEL E. WYMAN, ALPHONSO D. SULLIVAN,
*Examiners.*